(12) United States Patent
Mueller et al.

(10) Patent No.: US 8,670,627 B2
(45) Date of Patent: Mar. 11, 2014

(54) METHOD FOR EVALUATING VIDEO QUALITY

(75) Inventors: Stefan Mueller, VS-Villingen (DE);
Sébastien Weitbruch, Niedereschach/Kappel (DE); Arnaud Robert, Villecroze (FR)

(73) Assignee: Thomson Licensing (FR)

( * ) Notice: Subject to any disclaimer, the term of this patent is extended or adjusted under 35 U.S.C. 154(b) by 368 days.

(21) Appl. No.: 12/931,905

(22) Filed: Feb. 14, 2011

(65) Prior Publication Data

US 2011/0206298 A1  Aug. 25, 2011

(30) Foreign Application Priority Data

Feb. 23, 2010  (EP) ..................................... 10305172

(51) Int. Cl.
*G06K 9/36*  (2006.01)

(52) U.S. Cl.
USPC ........... 382/236; 382/103; 382/168; 382/266; 382/294

(58) Field of Classification Search
USPC .......................... 382/103, 168, 236, 266, 294
See application file for complete search history.

(56) References Cited

U.S. PATENT DOCUMENTS

| | | | |
|---|---|---|---|
| 5,365,603 A * | 11/1994 | Karmann | 382/291 |
| 6,285,798 B1 * | 9/2001 | Lee | 382/260 |
| 7,577,275 B2 * | 8/2009 | Ogawa | 382/103 |
| 7,688,999 B2 * | 3/2010 | Kim et al. | 382/103 |
| 7,865,014 B2 * | 1/2011 | Wu et al. | 382/168 |
| 8,184,200 B1 * | 5/2012 | Biswas et al. | 348/459 |
| 8,477,848 B1 * | 7/2013 | Patankar et al. | 375/240.16 |
| 2003/0123541 A1 * | 7/2003 | Jun et al. | 375/240.08 |
| 2005/0196015 A1 * | 9/2005 | Luo et al. | 382/103 |
| 2006/0018537 A1 * | 1/2006 | Wu et al. | 382/168 |
| 2006/0045334 A1 * | 3/2006 | Yang et al. | 382/168 |
| 2007/0140526 A1 * | 6/2007 | Pirim | 382/103 |
| 2007/0280129 A1 * | 12/2007 | Jia et al. | 370/252 |
| 2010/0215214 A1 * | 8/2010 | Pirim | 382/103 |
| 2010/0322319 A1 | 12/2010 | Xie et al. | |

FOREIGN PATENT DOCUMENTS

WO   WO2010003338   1/2010

OTHER PUBLICATIONS

AStatistical evaluation—algorithms. Sheikh et al., IEEE, 1057-7149,2006, pp. 3441-3452.*
Search Report Jun. 24, 2010.

* cited by examiner

*Primary Examiner* — Jayesh A Patel
(74) *Attorney, Agent, or Firm* — Jack Schwartz and Associates, PLLC (57) ABSTRACT

A method for evaluating video quality of a video stream comprising the steps of
a) calculating, for at least a first frame of a series of frames from said video stream, a true value of at least one video quality-related parameter associated to said first frame;
b) calculating a predicted value of said video quality-related parameter for at least a second frame from said series of frames based on said true value associated to said first frame;
c) calculating a true value of said video quality-related parameter associated to said second frame; and
d) judging the video quality of said second frame based on a difference between true and predicted values of the at least one video quality-related parameter associated to said second frame.

10 Claims, 6 Drawing Sheets

METHOD FOR EVALUATING VIDEO QUALITY

This application claims the benefit, under 35 U.S.C. §119 of EP Patent Application 10305172.8, filed 23 Feb. 2010.

FIELD OF THE INVENTION

The present invention relates to a method for evaluating video quality of a video stream, in particular to a method for detecting defective video frames within a video stream.

BACKGROUND OF THE INVENTION

In the past, such methods have not received much attention from developers of video equipment, although they have various useful applications. For example, such a quality evaluation may be employed in order to detect disturbances in a transmission channel for video data or for detecting defective scans of individual frames in a video stream generated by scanning analog video material. If a bad frame is detected in a video stream, the quality of the stream may be improved e.g. by discarding the bad frame, by retransmitting or rescanning it, or, if retransmitting or rescanning is unsuccessful, by restoring the bad frame based on e.g. frames preceding or succeeding it.

SUMMARY OF THE INVENTION

A useful method for evaluating video quality should be able to adapt to the type of video material which forms the stream. If a video stream is derived from an old black and white movie, its frames are bound to comprise much more salt and pepper noise than the frames of a video stream comprising e.g. modern HDTV material. A quality evaluation method which is to identify individual bad frames in a video stream must be able to adapt to such differences, otherwise it would frequently fail to detect quality defects that would strike a human viewer in high resolution low noise video material, whereas in noisy material it would object to many frames which, to a human viewer, would not appear substantially worse than the unobjected ones.

The object of the present invention is to provide such an adaptive method for evaluating video quality.

The object is achieved by a method comprising the steps of
a) calculating, for at least a first frame of a series of frames from said video stream, a true value of at least one video quality-related parameter associated to said first frame;
b) calculating a predicted value of said video quality-related parameter for at least a second frame from said series of frames based on said true value associated to said first frame;
c) calculating the true value of said video quality-related parameter associated to said second frame; and
d) judging the video quality of said second frame based on a difference between true and predicted values of the at least one video quality-related parameter associated to said second frame.

In the simplest case, the predicted value might be a plain and simple average or an extrapolated value obtained from the true value or values associated to said one or more first frames. It was found, however, that a highly reliable detection of existing quality defects is possible if the predicted value is calculated using a Kalman Filter.

In practice, above steps b), c) and d) are iterated for the frames of the series, and a frame used as a second frame in one of said iterations is used as one of said first frames in a subsequent iteration. In this way, the amount of data on which the calculation of the predicted value is based increases from one iteration to the next, and so does the reliability of the quality judgment.

If the series of frames does not comprise any scene cuts, image information tends to change gradually from one frame to the next. Therefore, the prediction of step b) is most reliable if the second frame is a successor or a predecessor of said at least one first frame in said series of frames.

The video quality-related parameter may be one of
contrast,
edge contrast ratio,
histogram difference,
noise intensity.

Quality defects of different types are most reliably detected if above steps a) to c) are carried out for a plurality of said video quality-related parameters, and the judging step d) is based on the differences between true and predicted values of all said parameters.

When the quality is judged based on a plurality of parameters, care should be taken to weight the influence of each parameter appropriately. To this effect, it is useful to normalize the differences between true and predicted values of said various parameters and to calculate a sum representative of the overall quality of a frame based on said normalized differences.

It is easily understood that the reliability of the prediction of step b) is the higher, the larger the number of first frames is on which the prediction is based. If it is too small, there is a high risk of a second frame being erroneously judged as bad. It was found, however, that the risk of an erroneous judgment is small if it is based on at least five and preferably at least ten first frames.

In step d) the second frame may be judged to be defective if the difference between true and predicted values or, if the judgement is based on more than one video quality-related parameters, the sum of these differences exceeds a predetermined threshold. Such a judgment may be final; according to an advanced embodiment of the invention it is only provisional, and a frame is definitively judged to be defective only if the provisional judgment is confirmed at least once.

Such a confirmation may be obtained by
aa) defining a first series of frames and a second series of frames;
bb) carrying out the above-defined method for said first series of frames,
cc) carrying out the above method for said second series of frames, and
dd) definitely judging a frame belonging to both said first and second series to be defective if it was provisionally judged to be defective in step bb) and in step cc).

The first and second series of frames may be different but overlapping, or they may be identical. At least in the latter case, the order in which the frames are judged in steps bb) and cc) should be different.

Further features and advantages of the invention will become apparent from the subsequent description of embodiments thereof referring to the appended drawings.

DETAILED DESCRIPTION OF PREFERRED EMBODIMENTS

FIG. 1 shows five frames from a test series formed of 104 video frames that was used for testing the method of the invention. The frame of FIG. 1A is the first frame of the series and happens to be a frame which is free from defects that would attract the attention of a human viewer. FIG. 1B shows frame 33 of the series. The defect of this frame is a flicker, i.e. it is globally brighter than preceding or succeeding frames, as can be recognized when comparing the grey level of structure 1, which fills a central region of the top half of the frame, with other frames. Frame 63 in FIG. 1Cc exhibits an easily noticeable blotch 2 in the centre of the frame. Frame 83 in FIG. 1D has a scratch 3 going across from top to bottom, which appears to be the result of scanning an image which was torn in two and not correctly mended. In frame 89 of FIG. 1E, there is another blotch 4 which is not as clearly visible as that of FIG. 1C since it is on dark background.

A variety of techniques can be employed (or a variety of parameters evaluated) for judging different aspects of image quality. According to an embodiment of the invention discussed in detail here, four such techniques or parameters are used, but it will be readily apparent to a skilled person that a larger or smaller number of techniques or parameters might also yield useful results.

A first technique which is employed in the method of the invention is the determination of edge change ratio, abbreviated ECR. ECR detection allows to quantify the amount of change which occurs between two successive frames. Conventionally, ECR detection is used for detecting scene cuts; i.e. it might be used for breaking up a long video stream comprising e.g. an entire movie or TV program into series of frames, each of which corresponds to a single scene and comprises only frames which smoothly blend into one another.

Figure 1A:
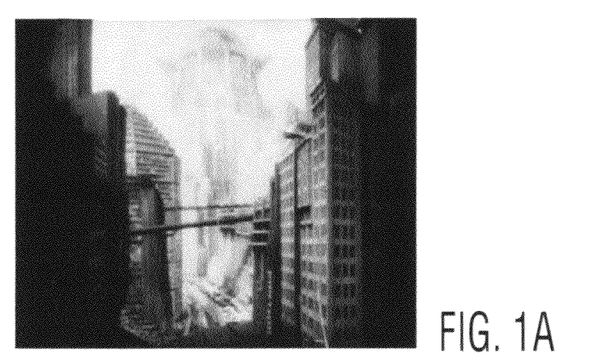
FIG. 1 shows a number of video frames from a test series that illustrate different types of defects.
Figure 1B:
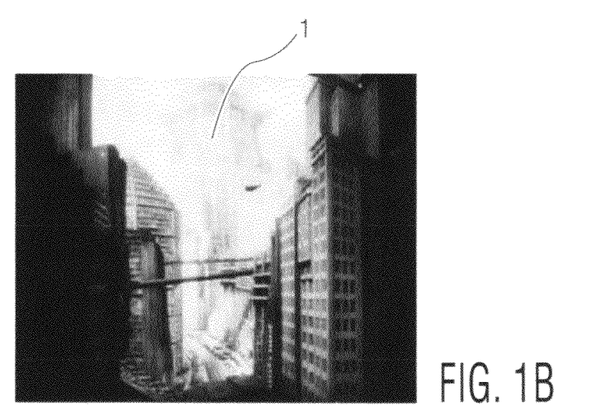
Figure 1C:
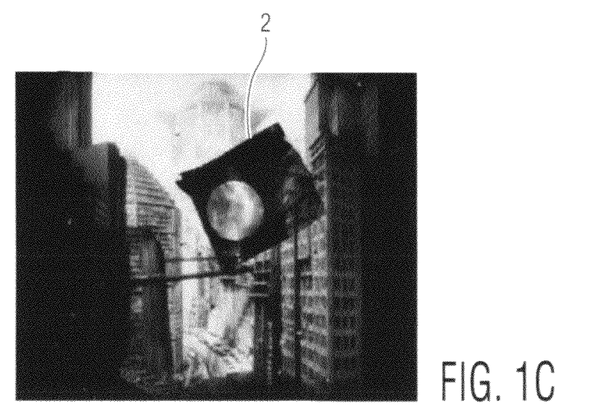
Figure 1D:
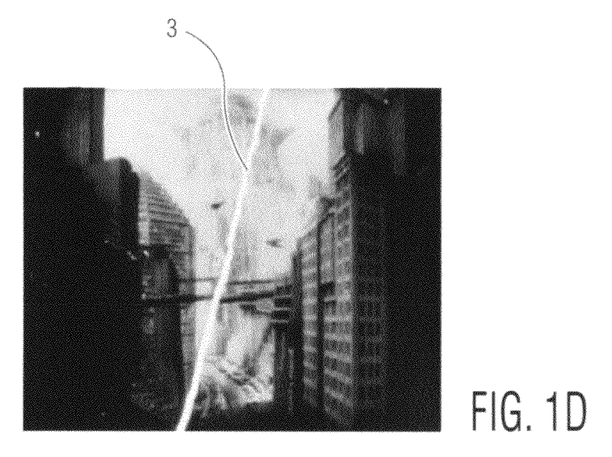
Figure 1E:
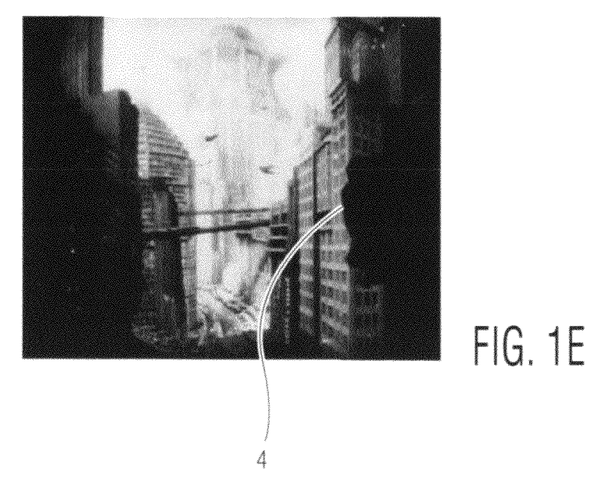
Figure 2:
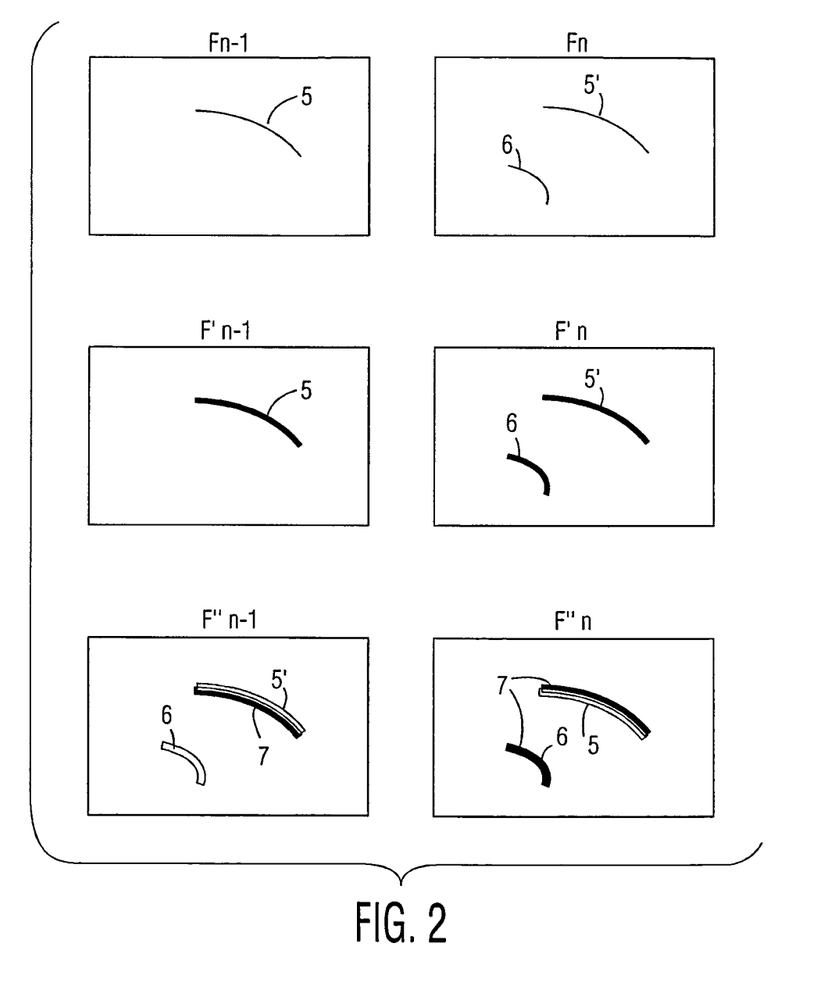
FIG. 2 illustrates the notion of edge change ratio (ECR) detection.

The edge contrast ratio $ECR_n$ of a frame Fn is defined by $$ECR_n = \max(X_n^{in}/\delta_n, X_{n-1}^{out}/\delta_{n-1}) \qquad (1)$$

wherein $\delta_n$ is the number of edge pixels in frame Fn, $\delta_{n-1}$ is the number of edge pixels in preceding frame Fn−1, and $X_n^{in}$ and $X_{n-1}^{out}$ are numbers of entering and exiting edge pixels, respectively. An edge pixel can be defined to be any pixel having a grey level which differs from the grey levels of neighbouring pixels by more than a predetermined threshold. An entering edge pixel is a pixel which is determined to be an edge pixel in frame n, but which neither was an edge pixel in frame Fn−1 nor had an edge pixel in its vicinity in frame Fn−1. Conversely, an exiting edge pixel is a pixel which was determined to be an edge pixel in frame Fn−1 but which neither is nor has an edge pixel in its vicinity in frame Fn. To illustrate the concept, reference is made to FIG. 2. At the top of FIG. 2, frames Fn−1 and Fn are shown, which have been subjected to edge detection and in which edges 5 and 5', 6, respectively, have been detected. Edges 5 and 5' correspond to a same moving object in both frames, whereas edge 6 of Fn has no corresponding edge in frame Fn−1. In a second processing step, the edges 5, 5', 6 are broadened to a predetermined width, as shown in frames F'n−1, F'n in the second row of FIG. 2. The number of edge pixels $\delta_{n-1}$, $\delta_n$ in these frames corresponds to the areas occupied by broadened edges 5 and 5', 6 in frames F'n−1, F'n, respectively. In a next step, one of the frames F'n−1, F'n is inverted and ANDed with the other. By doing this for both frames F'n−1, F'n, frames F"n−1 and F"n are obtained, in which exiting and entering edge pixels are shown in black. In frame $F"_{1-1}$, $X_{n-1}^{out}$ corresponds to blackened region 7. On the other hand, entering edge pixels $X_n^{in}$ correspond to blackened regions 7 in frame $F"_N$.

Figure 3:
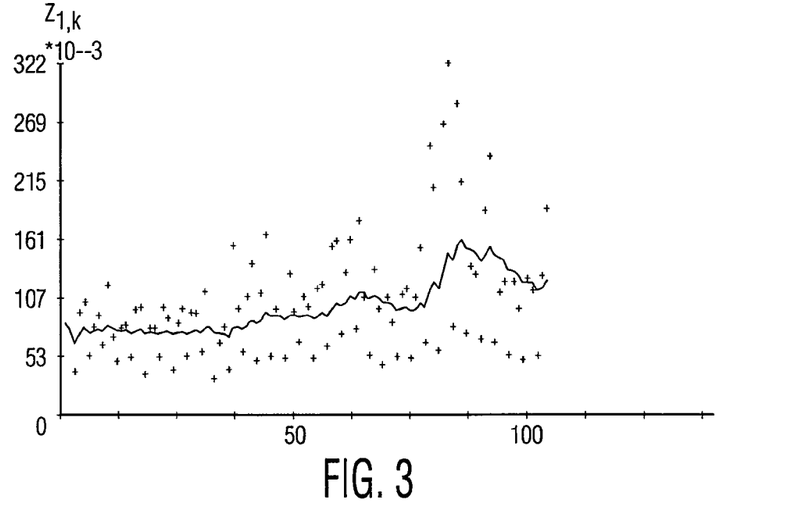
FIG. 3 is a diagram showing measured and predicted values of ECR for a series of frames.

FIG. 3 is a diagram in which ECR values from frames 1 to 104 of the test series are represented by little crosses. It can be seen that there are little peaks of the ECR around frames 32 and 63 of FIGS. 1B and 1C, but the most significant one appears near frame 82, corresponding to the scratch of FIG. 1D.

Although an evaluation of ECR proves useful for finding some of the defective frames of the test series, it is not sufficient for finding all of them. Therefore, it is appropriate to evaluate other quality-related parameters of the frames of the test series, too. One of these other parameters is contrast. Various different definitions of contrast and methods for computing it exist. One of the first definitions was given by Michelson in 1927:

$$C^M = \frac{L_{max} - L_{min}}{L_{max} + L_{min}}, \qquad (2)$$

where $L_{max}$ and $L_{min}$ are respectively the maximum and minimum intensity of the pixels present in an image.

Although the Michelson contrast might be used in the context of the present invention, it is not a preferred definition, because it is a global contrast, i.e. a frame showing a smooth transition from black on one side to white on the other would yield a maximum value of Michelson contrast although it would not be regarded as particularly rich in contrast by a human viewer. Therefore, a preferred definition of contrast is one which takes account not only of the total intensity difference but also of the distance between pixels having different intensities. A preferred definition of contrast and a method for computing it can be found in a paper by Gabriele Simone et. al. in SCIA2009, LNCS5575, pages 597 to 606, 2009, Springer Verlag Berlin, Heidelberg 2009. The general concept of Simone's is to compute, for each pixel of a frame, the pixel being identified by row and column coordinates x, y, a local intensity of said pixel x,y and its immediate vicinity $$R_c(x, y) = \sum_i \sum_j \text{Center}(i - x, j - y)I(i, j), \qquad (3)$$

and of surroundings of said pixel $$R_s(x, y) = \sum_i \sum_j \text{Surround}(i - x, j - y) I(i, j), \quad (4)$$

wherein I(i,j) is the intensity of a pixel at position (i,j) while centre(x,y) and surround(x,y) are bidimensional Gaussian functions:

$$\text{Center}(x, y) = \exp\left[-\left(\frac{x}{r_c}\right)^2 - \left(\frac{y}{r_c}\right)^2\right], \quad (5)$$

$$\text{Surround}(x, y) = 0.85 \left(\frac{r_c}{r_s}\right)^2 \exp\left[-\left(\frac{x}{r_s}\right)^2 - \left(\frac{y}{r_s}\right)^2\right] \quad (6)$$

$r_c$ and $r_s$ are set between 1 and 3 and between 2 and 4, respectively.

Evaluation of contrast can be done based on overall luminosity or, preferably, separately for each colour channel. If the evaluation of contrast is done by channel, a total measure of contrast can be computed as a weighted sum of the contrasts in each colour channel.

Figure 4:
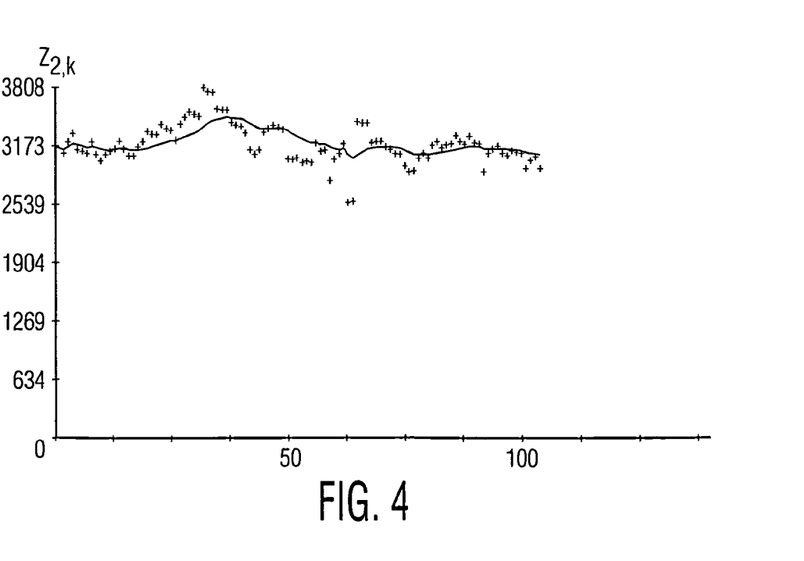
FIG. 4 is a diagram analogue to FIG. 3 showing measured and predicted contrast values.
Figure 5:
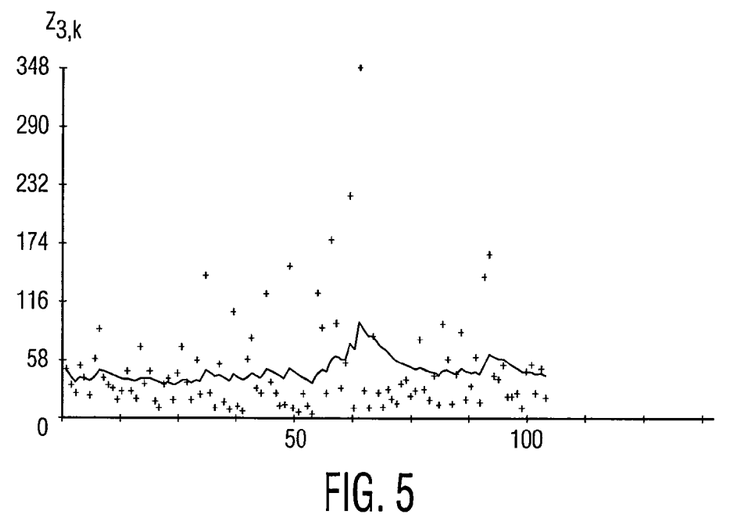
FIG. 5 is a diagram analogue to FIG. 3 showing measured and predicted histogram distances.

The result of contrast computations for the frames of the sample series are shown in FIG. 4. The largest changes of the contrast occur between frame 62 and 63 and between frames 64 and 65, corresponding to the appearance and disappearance of the blotch 2 of FIG. 1C.

A third quality-related parameter which is evaluated in the method of the present invention is the histogram difference. A histogram of a frame indicates, for each grey level of a predetermined scale, the number of pixels of the frame having said grey level. A distance between histograms of consecutive frames is conventionally used to detect scene changes, but it can also be used to detect frames which differ remarkably from preceding or succeeding frames due to defects. A suitable definition of the distance between histograms H(Fn−1), H(Fn) of frames Fn−1, Fn is $$d(H(Fn-1), H(Fn)) = \sqrt{\sum_{i=0}^{255} (H(Fn-1)(i) - H(Fn)(i))^2} \quad (7)$$

wherein H(F)(i) is the number of pixels in frame F having a grey level equal to i.

Figure 6:
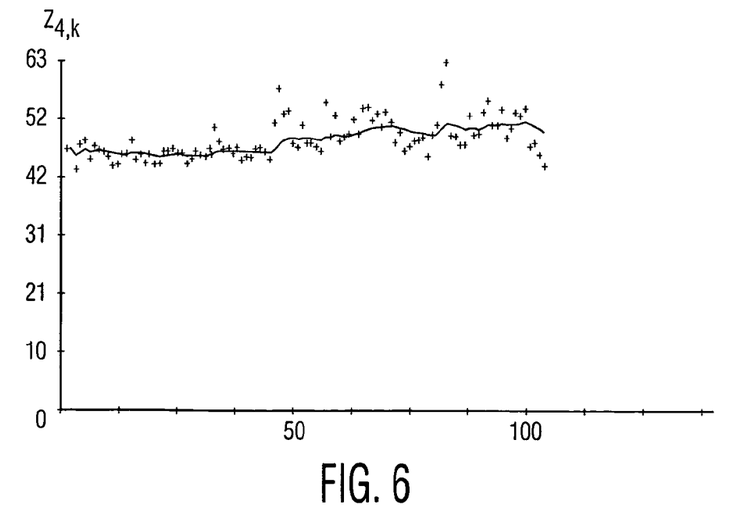
FIG. 6 is a diagram analogue to FIG. 3 showing measured and predicted noise values.

Histogram distances between consecutive frames from the test series computed using eq. (7) are shown in FIG. 6. A big peak around frame 63 is immediately noticeable, corresponding to blotch 2. Smaller peaks around frames 33, 50 and 90 suggest that defects might be present at these frames, too.

In a video stream, a pixel which does not have the value it should have, is regarded as noise. Detection of noise is based on redundancy, either spatial or temporal, i.e. based on an analysis of adjacent pixels in the same frame or of pixels in consecutive frames. Both approaches are applicable here, although the latter, also referred to as dynamic noise estimation or motion estimation, is preferred. Typically, motion estimation is carried out as follows: A frame, e.g. Fn−1, is divided into a plurality of blocks of a predetermined size, e.g. 8 by 8 pixels. For each of these blocks, in the subsequent frame Fn, a window is defined which comprises the location of the selected block and the vicinity thereof. The window may have e.g. 24 by 24 pixels. The motion of the selected block is determined, e.g. by finding the most similar block in the window of frame Fn. A mean square error is computed by subtracting the two blocks pixel by pixel and averaging the squared differences. A noise signal ratio is then derived from this mean square error. Noise values thus obtained for the test series are shown in FIG. 6. The most pronounced peak in this measurement is at frames 82 and 83, corresponding to the scratch of FIG. 1B.

Although the experimental data of FIGS. 3 to 6 tend to exhibit more or less pronounced peaks at defective frames, not all of these peaks can be straightforwardly distinguished from parameter fluctuations that occur between good frames. Since the image content of the frames of a series may vary, the observed parameters exhibit a certain statistical fluctuation, and this fluctuation may vary with time, too. I.e. a given amount of change between successive values of a parameter might be due to a defective frame in one region of a video stream, whereas in another it might be caused by statistical parameter fluctuation between good frames. In order to cope with this problem, the general idea of the invention is to predict an expected value of one of the above mentioned quality-related parameters for a given frame Fn based on data of said parameter obtained from previous frames Fn−1, Fn−2, . . . . If the fluctuation of said parameter values was small in the previous frames, the value expected for frame Fn can be predicted with a rather high degree of certainty, and a small deviation of the true parameter value from the expected one can indicate a defective frame, whereas if the fluctuation was large in the previous frames, the reliability of the prediction is low, and a larger deviation between predicted and observed values of the parameter is necessary in order to judge the present frame Fn as defective.

This general concept is implemented in a simple and efficient way using a Kalman filter. The principle of operation of the Kalman Filter does not depend on the type of parameter to which it is applied. Accordingly, the parameter z to which the following description refers can be any of the above mentioned parameters ECR, contrast, histogram distance, noise, or some other appropriate parameter.

The behaviour of a Kalman Filter is governed by the following equations

Prediction equations:

$$\hat{x}_k^- = \hat{x}_{k-1}, \quad (8)$$

$$P_k^- = P_{k-1} + Q. \quad (9)$$

Update equations:

$$K_k = \frac{P_k^-}{P_k^- + R}, \quad (10)$$

$$\hat{x}_k = \hat{x}_k^- + K_k(z_k - \hat{x}_k^-), \quad (11)$$

$$P_k = (1 - K_k) P_k^-. \quad (12)$$

In these equations $\hat{x}_k^-$ is a value of the parameter z predicted based on measured data of said parameter obtained from frames Fk−1, Fk−1 previous to frame Fk. $z_k$ is the true value of the parameter z obtained from frame Fk. When this true value $z_k$ has been computed, the prediction of the parameter is updated using eq. (11), wherein the coefficient $K_k$ is referred to as the Kalman gain, and $\hat{x}_k$ is the updated predicted value. The Kalman gain $K_k$ is computed using equations 10, 12 and 9. For starting the Kalman Filter, the terms R, Q, $\hat{x}_0$ and $P_0$ must be initialized. For $\hat{x}_0$ and $P_0$ the mean value and the variance of the parameter z obtained for the first 10 frames of the test series (i.e. the average and variance of $z_1, z_2, \ldots, z_{10}$)

can be used. The influence of these initializing values on the final result of the Kalman filter is not particularly significant. What is more important is the choice of an initializing value for R. It has proved practical to set R equal to the variance of the first 10 frames. Q may be set to R/100. Drawn-out lines in FIGS. 3 to 6 represent the estimated values $\hat{x}_k$ obtained for the various parameters using the above defined initial values. Noticeable deviations between the Kalman Filter prediction and the true values of parameter are indicative of bad quality of individual frames the video stream. Based on a comparison between true and predicted parameter values, regions of the video stream that comprise defective frames can be recognized more easily than based on the measured data alone. In particular, from FIGS. 3 and 5, relating to ECR and to histogram distance, it is apparent that there might be bad frames around frame 33, 43, 63 and 80 to 90.

Figure 7:
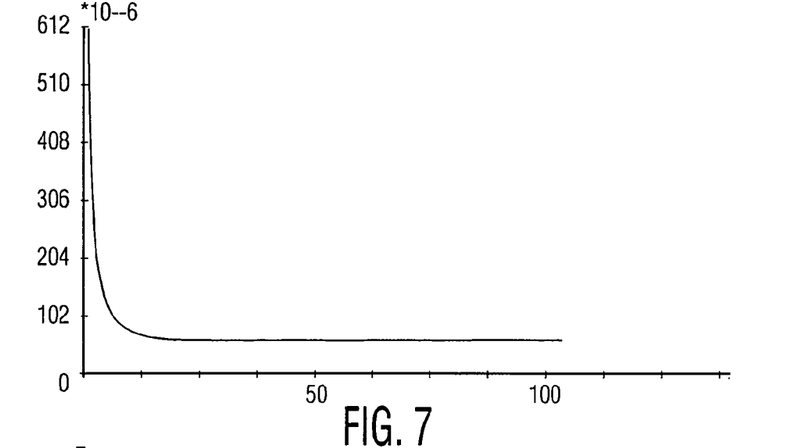
FIG. 7 illustrates the convergence velocity of predictions in the case of ECR.

The convergence velocity of the Kalman Filter is given by the covariance $P_k$, shown in FIG. 7. It is apparent from this figure that after approximately 10 frames the filter has converged, so that deviations between measured and predicted parameter values occurring after the $10^{th}$ frame are significant.

The numerical ranges of the parameters are all different. In order to compute a scalar parameter which quantifies image quality based on all of the above-considered parameters, it is necessary to normalize them. Each parameter is assumed to have a Gaussian distribution. Its density probability function f then is:

$$f(z_k) = \frac{1}{\sqrt{2\pi\sigma^2}} e^{-\frac{(z_k-\mu)^2}{2\sigma^2}} \quad (13)$$

wherein $z_k$ is the parameter value for frame Fk, $\mu$ is a mean value of the parameter z and $\sigma^2$ its variance.

For $\mu$ and $\sigma^2$, the mean value and variance obtained after the Kalman algorithm has been carried out, i.e. $\mu=\hat{x}_m$ and $\sigma^2=P_m$, may be used, m being the number of the last frame of the test series.

Each parameter z can then be normalized using the formula $$z_k^{norm} = \frac{z_k - \mu}{\sigma} \quad (14)$$

i.e. the normalized parameter $z_k^{norm}$ has zero average and unity variance.

As an alternative, it might be considered to use current values $\hat{x}_k$ and $P_k$ for $\mu$ and $\sigma^2$. Normalization according to eq. (14) might then not be absolutely exact, i.e. it might yield an average which is not exactly zero and a variance which is not exactly 1, but the normalization could be carried out in real time, as soon as frame Fk has been received and its parameter value $z_k$ computed.

Let $z_{i,k}^{norm}$ be the normalized value of parameter $z_i \in \{$ECR, contrast, histogram distance, noise, ...$\}$ for frame Fk. A combined quality parameter is then defined by $$(z_c)_k = \sqrt{\sum_i c_i \overline{z_{i,k}^{norm2}}/4} \quad (15)$$

Figure 8:
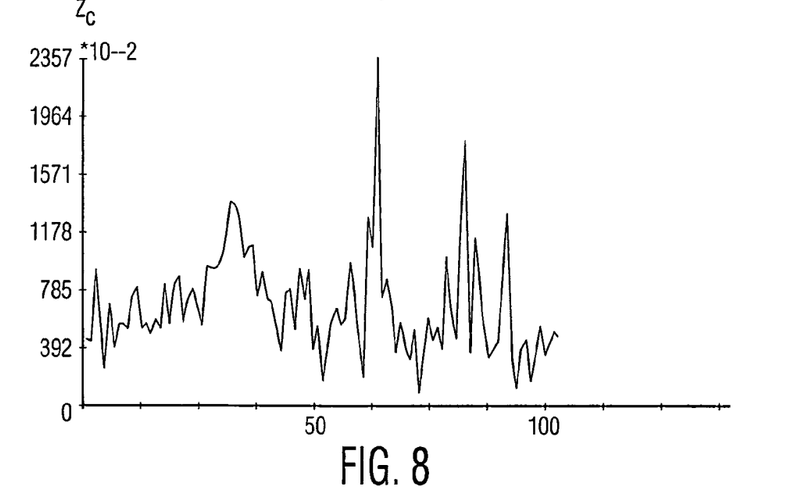
FIG. 8 is a diagram illustrating an overall estimated quality of the frames of the test series derived from the data shown in FIGS. 3 to 7.

In this equation $c_i$ is a weighting coefficient associated to each parameter. If all coefficients $c_i$ are set equal to 1, eq. (15) yields the combined quality parameter $z_c$ plotted in FIG. 8. Here, four peaks around frames 33, 63, 82 and 89 clearly indicate the defective frames.

It is conceivable that a judicious choice of weighting coefficients $c_i$, the use of other parameters than the ones described above or the use of modified definitions of contrast, edge change ratio etc. might make the defective frames stand out still more clearly.

Figure 9:
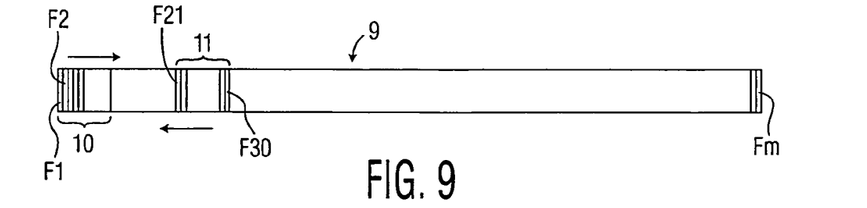
FIG. 9 is a diagram of the sample series illustrating alternative embodiments of the video quality evaluation method of the invention.

It is easily understandable that the quality of prediction, in particular in an initial phase of the Kalman filtering process, depends on the quality of the frames from which the initial values of R, Q, $\hat{x}_0$, $P_0$ are obtained. The risk of using bad frames for an initialization is reduced by the method illustrated referring to FIG. 9. In FIG. 9, bar 9 symbolizes a series of frames F1, F2, . . . , Fm of frames to be analyzed. While the frames are being received one after the other by a processor, the processor calculates parameter values $z_{i,k}$ of the parameters $z_i$ for the current frame $F_k$ and stores these. When the parameter values have been obtained for a starter group 10 of frames comprising e.g. frames F1 to F10, the Kalman filter is initialized and will filter the remaining frames F11, . . . , Fm of series 9. Later, a second group 11 of frames, e.g. F21 to F30, is received, and a second Kalman filter is initialized using parameter values $z_{i,k}$, k=21-30 obtained from the frames of group 11. By applying the second Kalman filter to the frames received before group 11 in reverse temporal order, the quality of the frames in group 10 can be verified. If a frame in group 10 is thus found to be bad, it is removed from group 10, the frame immediately following group 10, e.g. $F_{11}$, is added to group 10, and the first Kalman filter is re-initialized using the data of thus modified group 10 and is restarted.

Of course, the distance between groups 10 and 11 within the series of frames is completely arbitrary, and it is conceivable to place group 11 at the very end of the series. In that case, most frames of series 9 are filtered by both Kalman filters and one may be used to corroborate the results of the other, i.e. a frame is regarded as defective if it scores an excessively high value of the combined quality parameter $z_c$ in both filters.

What is claimed is:

1. A method for evaluating video quality of a video stream comprising the steps of:
    a) calculating, for at least a first frame of a series of frames from said video stream, a true value of at least one video quality-related parameter associated with said first frame;
    b) calculating a predicted value of said video quality-related parameter for at least a second frame out of said series of frames, the prediction being based on said true value associated with said first frame;
    c) calculating a true value of said video quality-related parameter associated with said second frame; and
    d) judging the video quality of said second frame based on the difference between true and predicted values of the at least one video quality-related parameter associated with said second frame, wherein the steps a) to c) are carried out for a plurality of video quality-related parameters, and the judging step d) is based on the differences between true and predicted values of all said parameters.

2. The method of claim 1 wherein said predicted values are calculated using a Kalman filter.

3. The method of claim 1, wherein steps a), b), c) and d) are iterated, and a frame used as a second frame in one of said iterations is used as one of said first frames in a subsequent iteration.

4. The method of claim 1, wherein the second frame is a successor of said at least one first frame in said series of frames.

5. The method of claim 1, wherein the second frame is a predecessor of said at least one first frame in said series of frames.

6. The method of claim 1, wherein said plurality of video quality related parameters comprise more than one of contrast, edge contrast ratio, histogram difference or noise intensity.

7. The method of claim 1, wherein step d) comprises the steps of normalizing said differences and
calculating a sum based on said normalized differences.

8. The method of claim 1, wherein the judgment of step d) is carried out only if at least ten first frames are available for calculating the predicted value in step b).

9. The method of claim 1, wherein in step d) the second frame is provisionally judged to be defective if said difference exceeds a predetermined threshold.

10. A method for evaluating video quality of a video stream comprising the steps of
   a) defining a first series of frames and a second series of frames;
   b) calculating, for at least a first frame of the first series of frames from said video stream, a true value of at least one video quality-related parameter associated with said at least first frame of the first series of frames;
   c) initializing a first filter based on said true value of the at least one video quality-related parameter associated with the first series of frames;
   d) filtering at least a second frame of the first series of frames using the first filter;
   e) calculating, for at least a first frame of the second series of frames from said video stream, a true value of at least one video quality-related parameter associated with said at least first frame of the second series of frames;
   f) initializing a second filter based on said true value of at least one video quality-related parameter associated with the at least first frame of the second series of frames;
   g) filtering frames of the first series of frames using said second filter;
   h) judging the video quality of said at least first frame of the first series of frames to be defective if a difference between said calculated true values and values obtained by filtering the first series of frames using the second filter exceeds a predetermined value;
   i) removing from said first series of frames any frame judged to be defective;
   j) modifying said first series of frames by adding subsequent frames to replace said removed frames of the first series of frames; and
   m) repeating steps c) and d) on the modified first series of frames.

* * * * *